(12) United States Patent
Johnson et al.

(10) Patent No.: US 7,890,360 B1
(45) Date of Patent: Feb. 15, 2011

(54) SYSTEM AND METHOD FOR AUTOMATED ANALYSIS OF SOURCING AGREEMENTS AND PERFORMANCE

(75) Inventors: Blake Johnson, 177 Toyon Rd., Atherton, CA (US) 94027; Allan Gray, Los Altos, CA (US); Dario Benavides, Cupertino, CA (US); Colin Kessinger, Menlo Park, CA (US); Venu Nagali, Cherry Hill, NJ (US); Richard Vistnes, Alameda, CA (US)

(73) Assignee: Blake Johnson, Del Mar, CA (US)

( * ) Notice: Subject to any disclaimer, the term of this patent is extended or adjusted under 35 U.S.C. 154(b) by 1708 days.

(21) Appl. No.: 10/269,794

(22) Filed: Oct. 11, 2002

Related U.S. Application Data

(60) Provisional application No. 60/328,946, filed on Oct. 12, 2001.

(51) Int. Cl.
G06F 17/50 (2006.01)
(52) U.S. Cl. .................................. 705/7; 705/8; 705/10
(58) Field of Classification Search ..................... 705/7, 705/8, 10
See application file for complete search history.

(56) References Cited

U.S. PATENT DOCUMENTS

| | | | |
|---|---|---|---|
| 5,148,365 A * | 9/1992 | Dembo | 705/36 R |
| 5,768,284 A | 6/1998 | Cox | |
| 5,974,395 A * | 10/1999 | Bellini et al. | 705/9 |
| 5,983,194 A | 11/1999 | Hogge et al. | |
| 6,006,192 A * | 12/1999 | Cheng et al. | 705/7 |
| 6,119,149 A | 9/2000 | Notani | |
| 6,125,355 A | 9/2000 | Bekaert et al. | |
| 6,183,103 B1 | 2/2001 | Cheng et al. | |
| 6,216,956 B1 | 4/2001 | Ehlers et al. | |
| 6,332,155 B1 | 12/2001 | Notani et al. | |
| 6,397,191 B1 | 5/2002 | Notani et al. | |
| 6,493,682 B1 | 12/2002 | Horrigan et al. | |
| 6,507,845 B1 | 1/2003 | Cohen et al. | |
| 6,516,301 B1 * | 2/2003 | Aykin | 705/10 |
| 6,671,673 B1 | 12/2003 | Baseman et al. | |
| 6,684,193 B1 * | 1/2004 | Chavez et al. | 705/8 |
| 6,769,013 B2 | 7/2004 | Frees et al. | |
| 7,031,929 B1 | 4/2006 | Button et al. | |
| 7,039,597 B1 | 5/2006 | Notani et al. | |

(Continued)

OTHER PUBLICATIONS

Billington et al, "A Real Options Perspective on Supply Chain Management in High Technology". Summer 2002 Journal of Applied Corporate Finance.*

(Continued)

*Primary Examiner*—Johnna R Loftis
(74) *Attorney, Agent, or Firm*—Kilpatrick Townsend and Stockton LLP

(57) ABSTRACT

A system and method is provided for sourcing agreement and performance analysis comprising the steps of identifying scenarios for material requirements, identifying scenarios for supply environments, identifying terms of existing and/or prospective sourcing agreements, identifying a set of sourcing agreement utilization policies, identifying inventory-related and shortage costs scenarios, and computing future sourcing performance based on the identified scenarios, existing or prospective sourcing agreements, and sourcing agreement utilization policies. Various cost/risk and other future performance measures (e.g., scenarios, metrics, etc.) are output from the stated computing step and business decisions.

57 Claims, 10 Drawing Sheets

U.S. PATENT DOCUMENTS

| | | |
|---|---|---|
| 7,134,096 B2 | 11/2006 | Brathwaite et al. |
| 7,590,937 B2 | 9/2009 | Jacobus et al. |
| 7,747,339 B2 | 6/2010 | Jacobus et al. |
| 7,747,500 B2 | 6/2010 | Hwang et al. |
| 2002/0165816 A1 | 11/2002 | Barz |
| 2002/0174000 A1* | 11/2002 | Katz et al. .................. 705/7 |
| 2003/0014355 A1 | 1/2003 | Browne et al. |
| 2003/0061126 A1* | 3/2003 | Erke et al. .................. 705/28 |
| 2004/0128261 A1 | 7/2004 | Olavson et al. |
| 2005/0004858 A1 | 1/2005 | Foster et al. |
| 2005/0097065 A1 | 5/2005 | Johnson et al. |

OTHER PUBLICATIONS

Steensma, H. Kevin. Kevin G. Corley. "On the Performance of Technology-Sourcing Partnerships: The Interaction between Partner Independence and Technology Attributes". The Academy of Management Journal, Vo. 43. No. 6. Dec. 2000 pp. 1045-1067 www.jstor.org/stable/1556334.*

Steensma, H. Kevin. Kevin G. Corley. Organizational Context as a Moderator of Theories on Firm Boundaries for Technology Sourcing. The Academy of Management Journal, Vo. 44. No. 2. Apr. 2001 pp. 271-291 www.jstor.org/stable/3069455.*

Coy, Peter. Exploiting Uncertainty; The "real-options" revolution in decision making. Business Week. New York: Jun. 7, 1999. Iss 3632; p. 118 from proquest.*

Nagali, Venu; David Sanghera; Jerry Hwang; Matt Gaskins; Cara Baez; Mark Pridgen; Patty Mackenroth; Dwight Branvold; Andre Kuper; Patrick Scholler. Procurement Risk Management (PRM) at Hewlett-Packard Company. HP Publication.*

Bernstein, Corrine. HP Pilots New E-Procurement Initiatives. EBN, p. 58. Feb, 26, 2001.*

Billington, Coey and Andre Kuper. Supply Chain Strategy: Real Options for Doing Business at Internet Speed. Hewlett-Packard Company. http://billington.ASCET.com Apr. 2000. pp. 223-226.*

Weng, Kevin Z. The power of coordinated decisions for short-life-cycle products in a manufacturing and distribution supply chain. IIE Transactions, 31, 11 1037. Nov. 1999.*

Leathers, Howard D. Comparative statics of productions when there are multiple sources of risk. Atlantic Economic Journal, v19, n3, p. 26 Sep. 1991.*

Cachon, G., "Supply Chain Coordination with Contracts", Chapter 6 of Handbooks in Operations Research and Management Science: Supply Chain Management, Steve Graves and Ton de Kok, editors, North Holland, 2003, 126 pages.

Johnson, B., "Conceptual and Methodological Differences in Quantifying and Managing 'Commoditized' and 'Non-Commoditized' Risks'", Conference on Integrated Risk Management, Washington University, St. Louis, Missouri, Jun. 9, 2004, 10 pages.

Johnson, B., "Optimizing Tool Availability and Lead Time with Procurement Options", Proceedings of the Thirteenth Annual International Symposium on Semiconductor Manufacturing, San Jose, California, Sep. 2005, 4 pages.

Martinez De Albeniz, V., et al. "Mean-Variance Trade-offs in Supply Contracts", Wiley InterScience, Naval Research Logistics, vol. 53, 2006, pp. 603-616.

Vaidyanathan, V., et al. "Using Capacity Options to Better Enable Our Factory Ramps", Intel Technology Journal (Aug. 3, 2005) vol. 9(3):185-191.

Van Dam, C. "Supply Risk and Flexibility Management at Agilent", Parallax View, Jun. 2004, 5 pages.

Bradley University, Black-Scholes—Option Pricing Models, http://bradley.edu/~arr/bsm/pg01.html.

Lucia, J.J. et al., "Electricity Prices and Power Derivatives: Evidence from the Nordic Power Exchange," 2000, pp. 1-42, University of California, Los Angeles, Anderson School of Management.

Patie, P., "On the First Passage Times of Generalized Ornstein-Uhlenbeck Process," Apr. 2003, pp. 1-18, RiskLab, Switzerland.

Mean Reversion Models, http://sphere.rdc.puc-rio.br/marco.ind/revers.html.

* cited by examiner

SYSTEM AND METHOD FOR AUTOMATED ANALYSIS OF SOURCING AGREEMENTS AND PERFORMANCE

CROSS-REFERENCE TO RELATED APPLICATIONS

This application claims the priority and benefit of U.S. Provisional Patent Application Ser. No. 60/328,946 entitled "System and Method for Automated Analysis of Sourcing Agreements and Performance," filed on Oct. 12, 2001, which is hereby incorporated by reference.

BACKGROUND OF THE INVENTION

1. Field of the Invention

The present invention relates generally to material sourcing, and more particularly to a system and method for automated analysis of sourcing agreements and performance.

2. Description of Related Art

Proper management of material sourcing policies and structuring of material sourcing agreements is a huge challenge to virtually every business. Typically, material costs comprise 30-70% of revenue and drive a business' gross margin. Material costs, inventory, and availability are key sourcing related business performance metrics. Thus, the business must constantly balance costs with inventory and availability. For example, the business may have an option of purchasing a particular material at a relatively low price. However, if the business cannot turn around and sell the material or a by-product of the material relatively quickly, the business is then required to store the material, leading to inventory-related costs and reduced working capital. Alternatively, if the business has reason to believe that future availability of the item is low, and thus will result in an increased price for the material, the high inventory-related costs and reduced capital may be acceptable and more feasible in the long term.

Conventionally, businesses are faced with various sourcing risks including price risk, availability risk, and demand risk. Uncertain or inaccurate forecasts can lead to demand risks, while uncertainty of prices leads to price risk. If demand is high for an item, then the price is generally higher, and the converse is true. However, one cannot predict, with precise certainty, demands of a market. Finally, an uncertainty in supply leads to an availability risk. Supply uncertainty may include capacity shortages, quality problems, supplier allocation decisions, delivery disruptions, technology changes, and termination of production of a material by its supplier. Supply uncertainty is also related to demand and price uncertainty. For example, the higher the demand, the higher the costs and likelihood that availability is lower. All of these sourcing risks define potential profitability of the business.

Accordingly, businesses must structure supply agreements in such a way as to optimize future business performance. However, proper structuring of supply agreements requires a business to identify a range of possible demands, prices, and supply forecast scenarios, and to assign probabilities of likelihood to these scenarios. Generally, a plurality of scenarios should be developed including, for example, base, high, and low scenarios. In this most basic example, the base scenario is a standard forecast, while high and low scenarios capture uncertainty around the base forecast. Any desired number of additional scenarios may be developed for special or unique circumstances which may affect price, demand, and supply of the material. Once these scenarios have been developed, then steps must be taken to reduce sourcing uncertainty and improve economic performance.

One conventional method for reducing sourcing uncertainty is for a business to develop and enter into proper sourcing agreements, and more particularly, structured sourcing agreements. Sourcing agreements refer to any of a broad array of possible sourcing arrangements, ranging from very formal, structured agreements (e.g., legally binding agreements with specific terms and conditions) to very informal, unstructured agreements (e.g., verbal agreements with few if any specific terms and conditions). Structured sourcing agreements are buyer-supplier agreements that include defined prices and/or quantity terms, as well as lead times, payment terms, penalties, and other payments and liabilities. When entering into a structured sourcing agreement, the business must determine a level of commitment to specific (or a range of) prices and quantities. The business must also determine what cost the business is willing to pay for flexibility. Numerous other considerations may be contemplated in order to develop structured sourcing agreements.

Accordingly, the structured sourcing agreement may be a fixed price sourcing agreement, a fixed quantity sourcing agreement, a quantity flexible sourcing agreement where a commitment is made to buy/supply over a defined range, or a sourcing agreement with a combination of these and other terms and conditions, such as delivery lead times and quality and other performance commitments. In order to reduce sourcing uncertainty, the business must create and enter into these sourcing agreements tailored to specific sourcing requirements, circumstances, and objectives, typically, with a portfolio of complementary structured sourcing agreements.

The practical application of scenario development and sourcing performance analysis is highly complex, time consuming, and often difficult to perform. A business is typically not able to factor in various trade-offs between sourcing agreements over time. Furthermore, determining proper utilization of sourcing agreements requires a full understanding of sourcing situations, an evaluation of impact on future business performance, and proper development of sourcing agreement strategies. Therefore, there is a need for a system and method for automated analysis of sourcing agreements and sourcing performance. There is a further need for this system and method to be relatively easy to operate.

SUMMARY OF THE INVENTION

The present invention provides a system and method for quantifying, analyzing, and determining future costs and risks from implementation of particular sourcing agreements given utilization policies for those sourcing agreements. An analysis system includes a cost/risk generator, which takes various user inputs and calculated scenarios and generates a series of outputs for each future scenario. The calculated scenarios may be generated by various engines within the analysis system, which may include a requirement engine, supply environment engine, inventory-related costs processor, and shortage costs processor. A complete set and distribution of these scenarios may be represented mathematically as stochastic processes, with appropriate correlation structure, or more generally joint distribution, between the processes representing each uncertainty. Alternatively, scenarios may be provided by a user or obtained from another source.

The cost/risk generator takes all the material requirement scenarios, supply environment scenarios, current sourcing agreements and inventory, inventory-related costs and shortage costs scenarios and performs analysis of sourcing agreements and performance including computing future sourcing cost and risk outputs based on the input sourcing agreement utilization policies. The outputs are a range of results including distribution of future inventory, material shortages, material costs, inventory-related costs, and shortage costs over time for each future scenario. The resulting cost and risk outputs provide guidance to a user as to the relative benefits of alternative sourcing agreement structures and combinations of sourcing agreements given utilization policies for these structures and combinations under different future scenarios given particular business goals and constraints.

The range of outputs provide guidance to a user as to future circumstances based on implementation of certain sourcing agreements and relationships and utilization policies for these agreements and relationships. The user must ultimately decide, given the various outputs, which sourcing agreements and relationships and utilization policies for these agreements and relationships are best for the business.

DESCRIPTION OF EXEMPLARY EMBODIMENTS

The present invention provides a system and method for determining and proposing effective sourcing agreements and their utilization policies, and for analyzing and comparing sourcing performance for given sets of sourcing agreements and their utilization policies. The system and method may require tracking impact of past dealings and relationships over time in order to determine how past dealings may affect future sourcing agreements, utilization of these sourcing agreements, and future sourcing performance.

Figure 1:
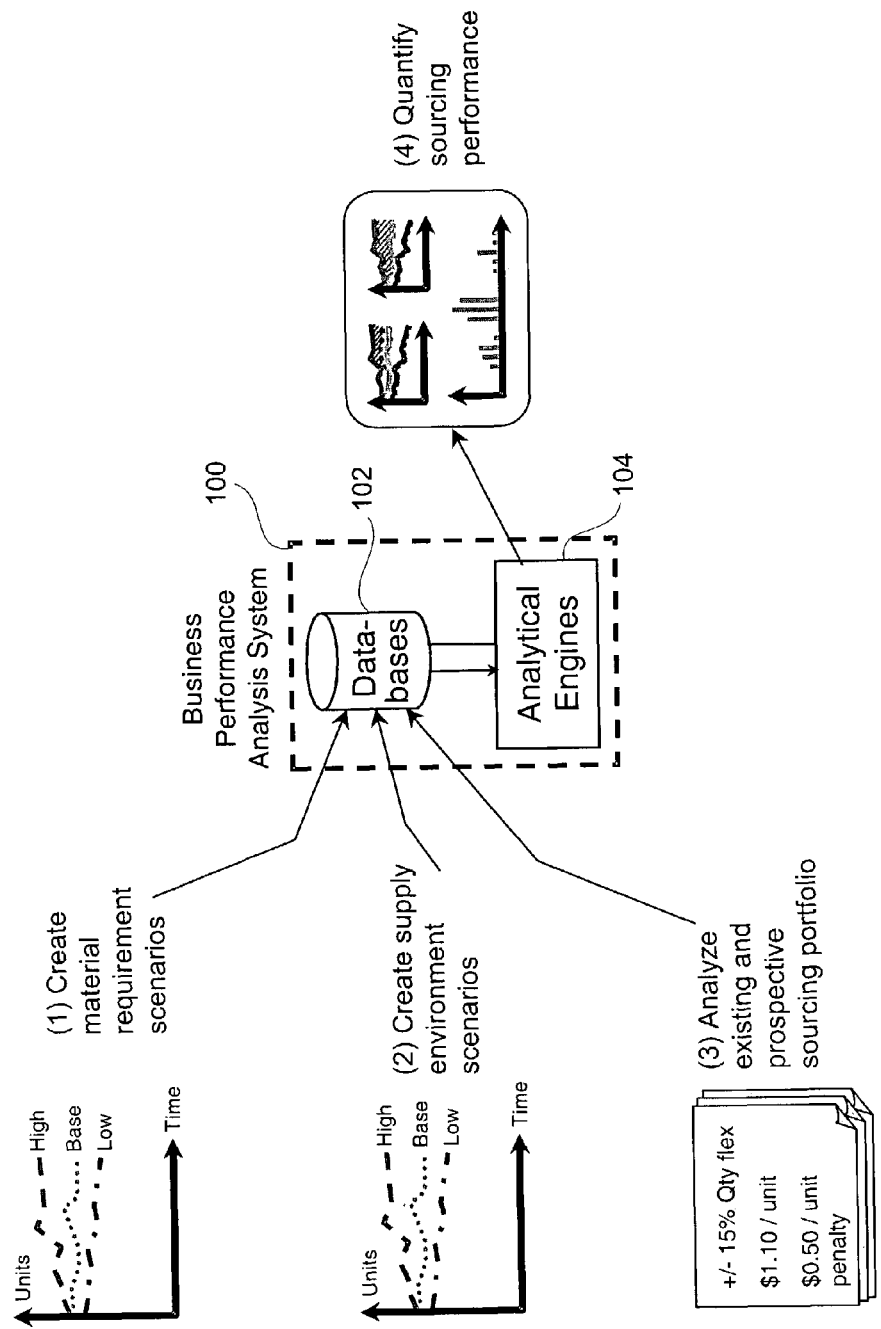
FIG. 1 is an exemplary high level overview diagram of the present invention for analysis of sourcing agreements and performance.

FIG. 1 is a high level overview diagram of the present invention for analysis of sourcing agreements and performance. As shown, various inputs are required to be entered into a business performance analysis system 100. The inputs include material requirement scenarios, supply environment scenarios, and their relationships; inventory-related costs and shortage costs information, which may also be specified by scenario; and existing and prospective sourcing agreements. A complete set and distribution of these scenarios may be represented mathematically as stochastic processes, with appropriate correlation structure, or more generally joint distribution, between processes representing each uncertainty. These inputs may be entered into a database 102 or, alternatively, may be developed by analytical engines 104 within the business performance analysis system 100. The creation of these various inputs will be discussed in more detail in connection with FIGS. 2-6. Subsequently, the various analytical engines 104 of the business performance analysis system 100 take the numerous inputs and produce at least one result reflecting sourcing goals and performance. Although specific inputs are listed above, those skilled in the art will recognize that not all these inputs may be used or other inputs may be employed by the business performance analysis system 100.

Figure 2:
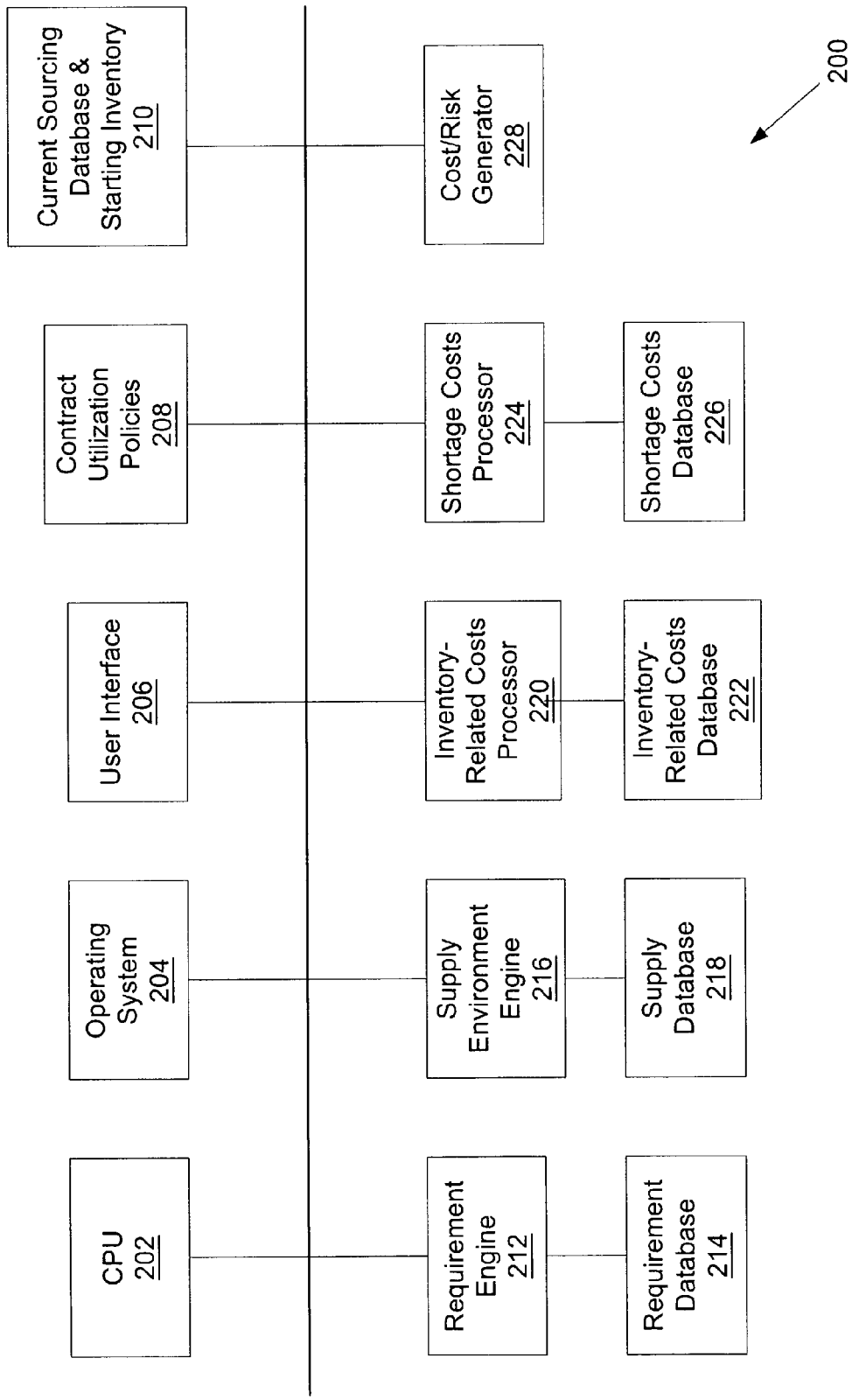
FIG. 2 is an exemplary block diagram of a sourcing agreement and performance analysis system for implementing the present invention.

FIG. 2 is an exemplary block diagram of a business performance analysis system 200, according to the present invention. The analysis system 200 comprises a central processing unit (CPU) 202, an operating system 204, a user interface 206, sourcing agreement utilization policies 208 and a current sourcing database and starting inventory 210. The analysis system 200 further comprises a requirement engine 212, a corresponding requirement database 214, a supply environment engine 216, a corresponding supply database 218, a inventory-related costs processor 220, a corresponding inventory-related costs database 222, a shortage costs processor 224, a corresponding shortage costs database 226, and a cost/risk generator 228. In alternative embodiments, more or less processors, databases, or other elements may be coupled to the business performance analysis system 200.

The analysis system 200 takes various input information, formulates scenarios, and performs analyses of these scenarios to determine at least one sourcing performance analysis result. The analysis system 200 relies on information and preferences input by the user in order to perform the analysis. The information and preferences are entered into the analysis system 200 through the user interface 206, which will be discussed in more detail in connection with FIG. 8.

The sourcing agreement utilization policies 208 contain rules which drive the analysis process of the present invention. The sourcing agreement utilization policies 208 are related to certain key metrics such as inventory and related costs, supply availability, and price performance. These metrics combined form a framework for making sourcing decisions. Thus, objectives of the sourcing agreement utilization policies 208 are set by these metrics.

In one embodiment, data used to establish the sourcing agreement utilization policies 208 may be input by a user. For example, the user may require that the lowest material costs be the driving factor in the analysis process. Therefore, the sourcing agreement utilization policies 208 will contain a lowest material costs requirement. In an alternative embodiment, the analysis system 200 may derive the sourcing agreement utilization policies 208 based on guidance from the user such as minimization of material costs, risks, and inventory-related costs over a certain period of time. Thus, if the user prefers reducing total sourcing costs or risks in the next year, the sourcing agreement utilization policies 208 will contain requirements reflecting this preference. Other rules include, but are not limited to, minimizing inventory level, minimizing inventory-related costs, reducing shortage levels, or reducing uncertainty about the future value of any such variables. If no guidance is given by the user, a series of generic policies may be generated from which the user may choose.

Setting objectives in the sourcing agreement utilization policies 208 may be difficult as tradeoffs must be made between different metrics and within particular metrics (e.g., between expected value and risk). For example, a tradeoff between different metrics may involve reducing inventory-related costs and reducing prices. Alternatively, an example of tradeoff between expected value and risk is between a reduced expected sourcing cost and increase predictability of sourcing cost. Ideally, a strategy that improves both metrics at the same time is desired. Although, a strategy that improves one metric without adversely affecting the other metric is also desirable. Additionally, these metrics can be used to identify potential future sourcing risk exposures such as inventory spikes or shortages, price spikes, or significant increases in overall sourcing costs.

Current sourcing database and starting inventory 210 contains data regarding a status quo. The data include terms and conditions of existing and prospective sourcing agreements and present inventory of materials, including materials currently on order but not yet received. Current sourcing data are vital to the analysis process because the current sourcing data have direct impact on an outcome of the analysis process. For example, if there is currently a large inventory, a lower need exists for purchasing materials in a near term. Thus, sourcing agreements may be negotiated or utilized accordingly.

The various remaining databases contain corresponding generated or input scenarios which will be utilized by the cost/risk generator 228 during the optimization process. Thus, the requirement database 214 includes scenarios of material requirements at various future periods in time, while the supply environment database 218 contains price and availability scenarios. Consequently, the inventory-related costs database 222 holds inventory-related costs scenarios, and the shortage costs database 226 stores shortage costs scenarios.

Figure 3A:
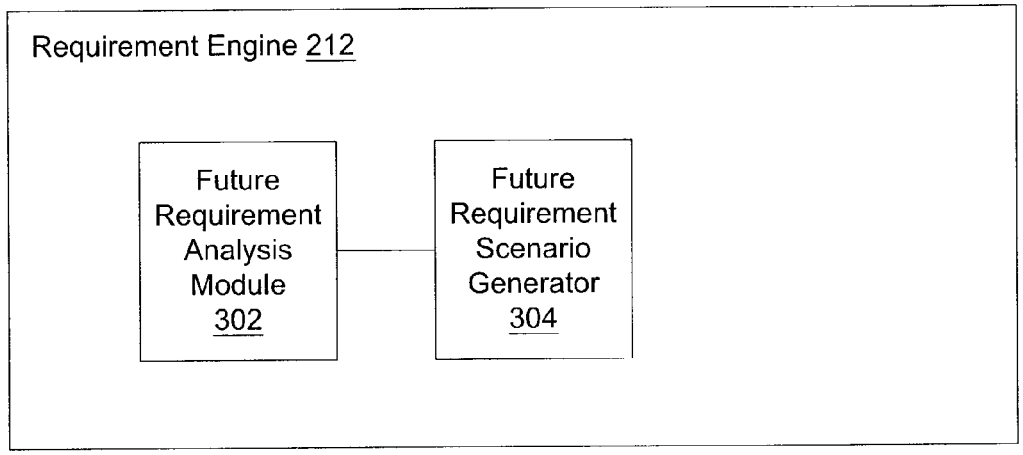
FIG. 3a is an exemplary block diagram of the requirements engine of FIG. 2.

FIG. 3a illustrates an exemplary block diagram of the requirement engine 212 of FIG. 2 in more detail. The requirement engine 212 includes a future requirement analysis module 302 and a future requirement scenario generator 304. The future requirement analysis module 302 takes user-input information, which may be in the form of formulas, graphs, spreadsheets, or data located in databases, data warehouses, legacy data stores, enterprise resource planning (ERP) systems, or other locations, and calculates future requirements data. Thus, if the input information is in the form of a formula, data points may be calculated, while data points may be extracted from graphs or data warehouses. Alternatively, spreadsheets may be mined for data point information.

Regardless of how the data points are obtained, the data point information are then sent to the future requirement scenario generator 304. The future requirement scenario generator 304 takes the data point information and identifies possible requirement scenarios or forecasts, which are based on a series of sequences of uncertain events over time. These requirement scenarios are then stored in the requirement database 214 (FIG. 2). Alternatively, the requirement scenarios may be predefined and be directly input by a user into the requirement database 214.

Figure 3B:
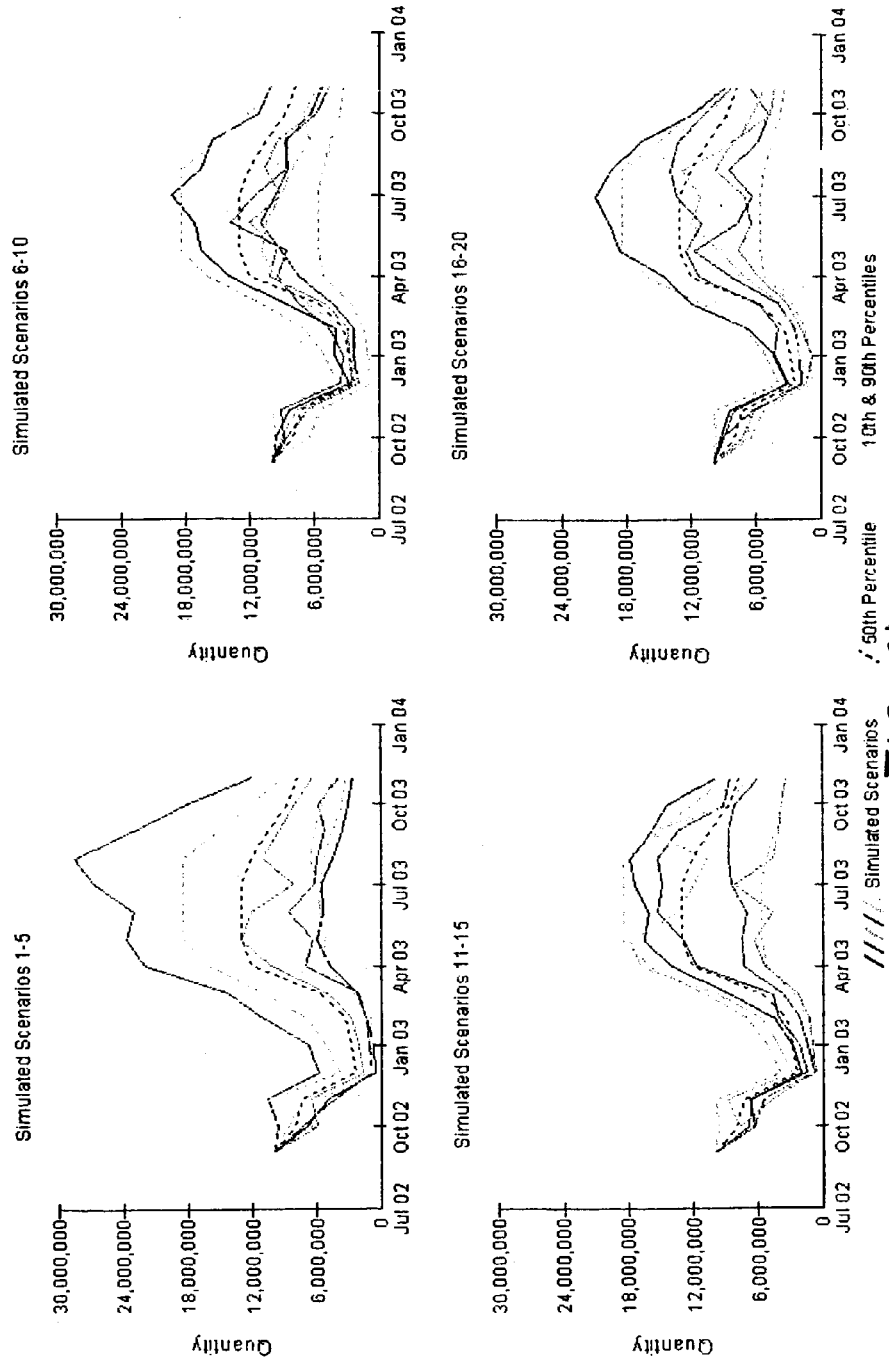
FIG. 3b are exemplary graphs of material requirement scenarios.

FIG. 3b are exemplary charts of material requirement scenarios generated by a material requirement engine 212 (FIG. 2), and displayed on a display of the user interface 206 (FIG. 2). As illustrated in this exemplary embodiment, the material requirements are based on a time period between July 2002 and January 2004. As illustrated in FIG. 3b, in addition to the scenario values over time, the $10^{th}$, $50^{th}$, and $90^{th}$ percentiles of the distribution of scenario values at each point in time are also calculated and graphed.

Figure 4A:
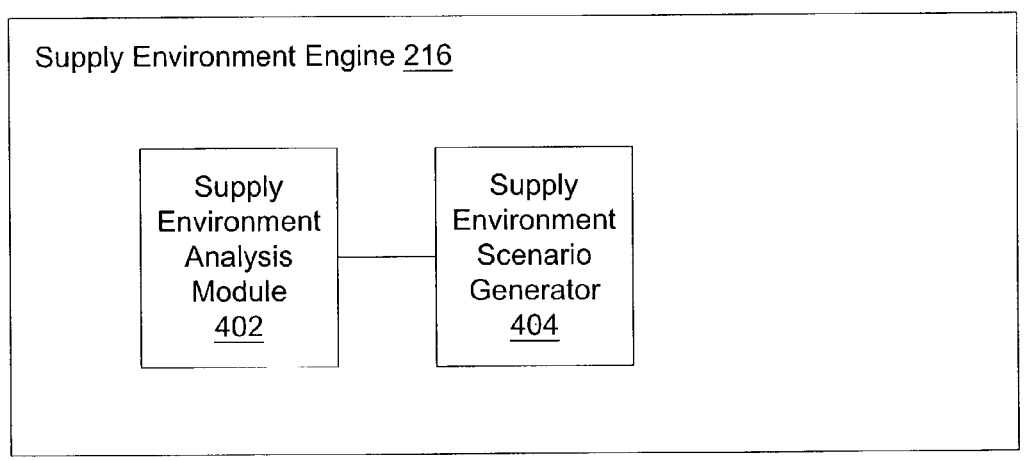
FIG. 4a is an exemplary block diagram of the supply environment engine of FIG. 2.

FIG. 4a shows an exemplary block diagram of the supply environment engine 216 of FIG. 2. The supply environment engine 216 includes a supply environment analysis module 402 and a supply environment scenario generator 404. As with the requirement engine 212 (FIG. 3), the supply environment analysis module takes input data, which may be in the form of formulas, graphs, spreadsheets, or other types of data sources, or data located in databases, data warehouses, legacy data stores, ERP systems, or other locations, and calculates future supply environment data. Thus, if the input information is in the form of a formula, data points may be calculated, while data points may be extracted from graphs. Alternatively, spreadsheets may be mined for data point information.

Subsequently, the data point information are then sent to the supply environment scenario generator 404. The supply environment scenario generator 404 takes the data point information and identifies possible supply environment scenarios or forecasts, which are based on a series of sequences of uncertain events over time. These supply environment scenarios are then stored in the supply database 218 (FIG. 2). Alternatively, the supply environment scenarios may be predefined and be directly input by a user into the supply database 218.

Figure 4B:
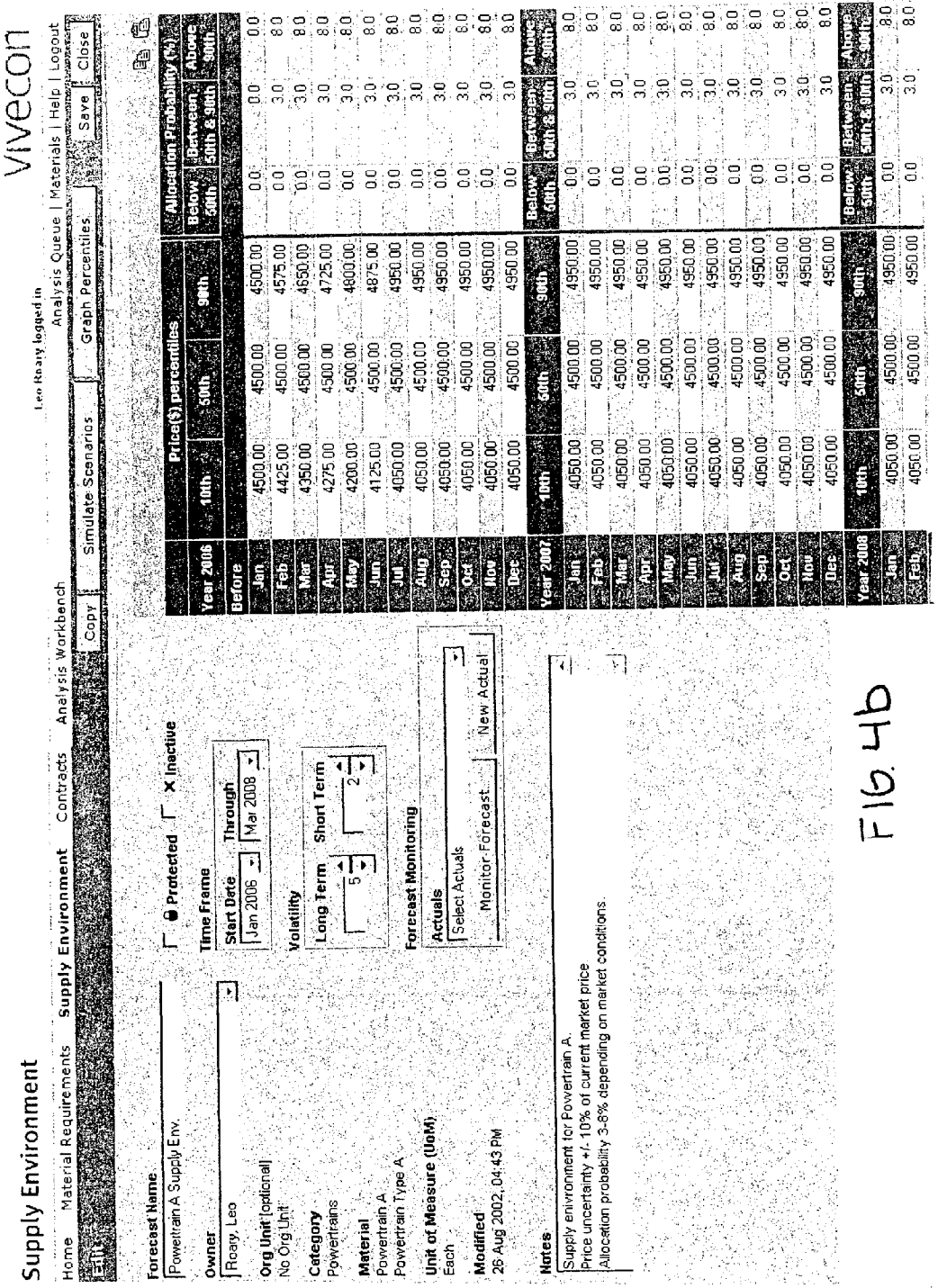
FIG. 4b is an exemplary chart of supply environment engine input.

FIG. 4b illustrates an exemplary set of inputs to a supply environment engine 216 (FIG. 2), and displayed on an output device of the user interface 206 (FIG. 2). As illustrated in this exemplary embodiment, the supply environment scenario data are collected for a time period between January 2006 and March 2008. A constraint regarding the $10^{th}$ and $90^{th}$ percentiles of price uncertainty being +10% and −10% of the 50th percentile market price at each point in time is noted, as well as having an allocation probability of 3%-8% depending on market conditions. These constraints and time periods may be entered by the user or generated by the analysis system 200 (FIG. 2). In alternative embodiments, other factors or settings may be utilized based on the supply environment scenario desired.

Figure 5:
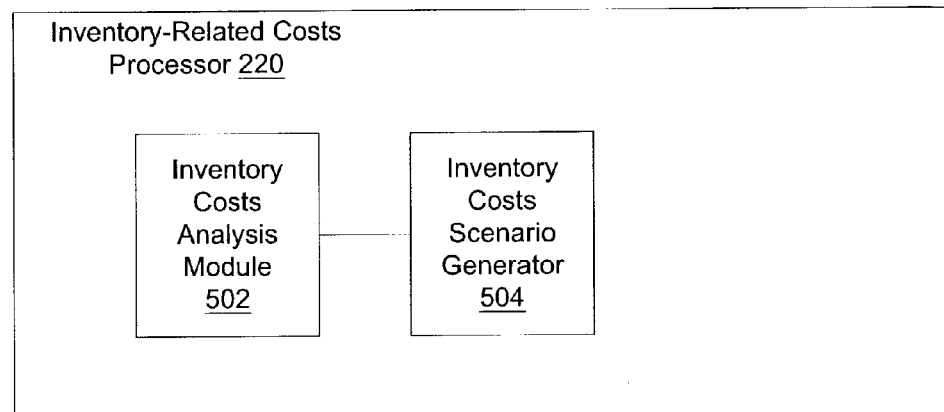
FIG. 5 is an exemplary block diagram of the inventory-related costs processor of FIG. 2.

Referring now to FIG. 5, an exemplary block diagram of the inventory-related costs processor 220 is shown. The inventory-related costs processor 220 includes a inventory costs analysis module 502 and a inventory costs scenario generator 504. The inventory costs analysis module 502 calculates inventory-related costs data based on user-input data. Inventory-related costs result from the need for the business to store, finance, and in some cases write-off or salvage excess materials. As with the requirement engine 212 (FIG. 3a) and the supply environment engine 216 (FIG. 4a), input data may be in the form of formulas, graphs, spreadsheets, or other types of data sources, and the results from the inventory costs analysis module 502 may be in the form of data and data points. Next, the inventory-related costs data are then utilized by the inventory costs scenario generator 504 to define inventory-related costs scenarios (including inventory-related costs parameters), which are subsequently stored in the inventory-related costs database 222 (FIG. 2).

Figure 6:
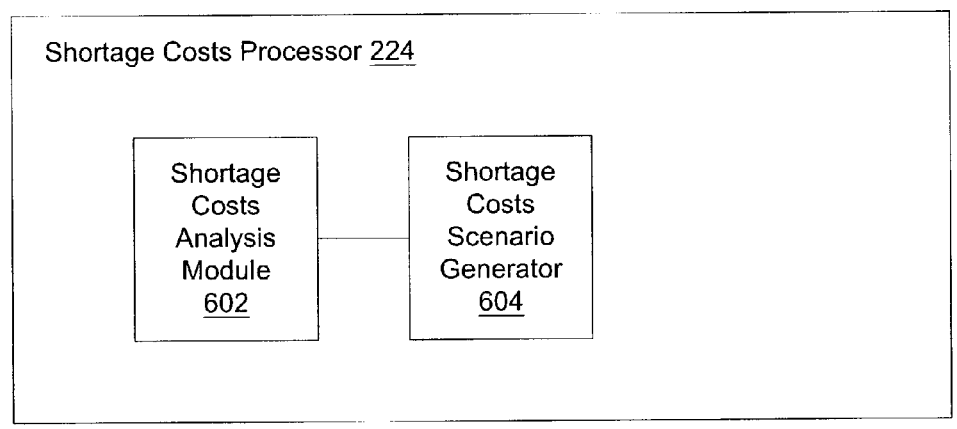
FIG. 6 is an exemplary block diagram of the shortage costs processor of FIG. 2.

An exemplary block diagram of the shortage costs processor 224 is illustrated in FIG. 6. As shown, the shortage costs processor 224 includes a shortage costs analysis module 602 and a shortage costs scenario generator 604. Initially, shortage costs data are determined by the shortage costs analysis module 602. Shortage costs are the costs endured by the business resulting from a lack or short supply of a material. For example, a shortage of a material may cause production to be slowed down or stopped, often resulting in fewer end products available. Subsequently, the shortage costs scenario generator 604 uses the shortage costs data to define scenarios for shortage costs (including shortage costs parameters). Alternatively, the inventory-related and shortage costs may be predefined and be directly input by a user into the inventory-related costs database 222 and the shortage costs database 226.

Figure 7:
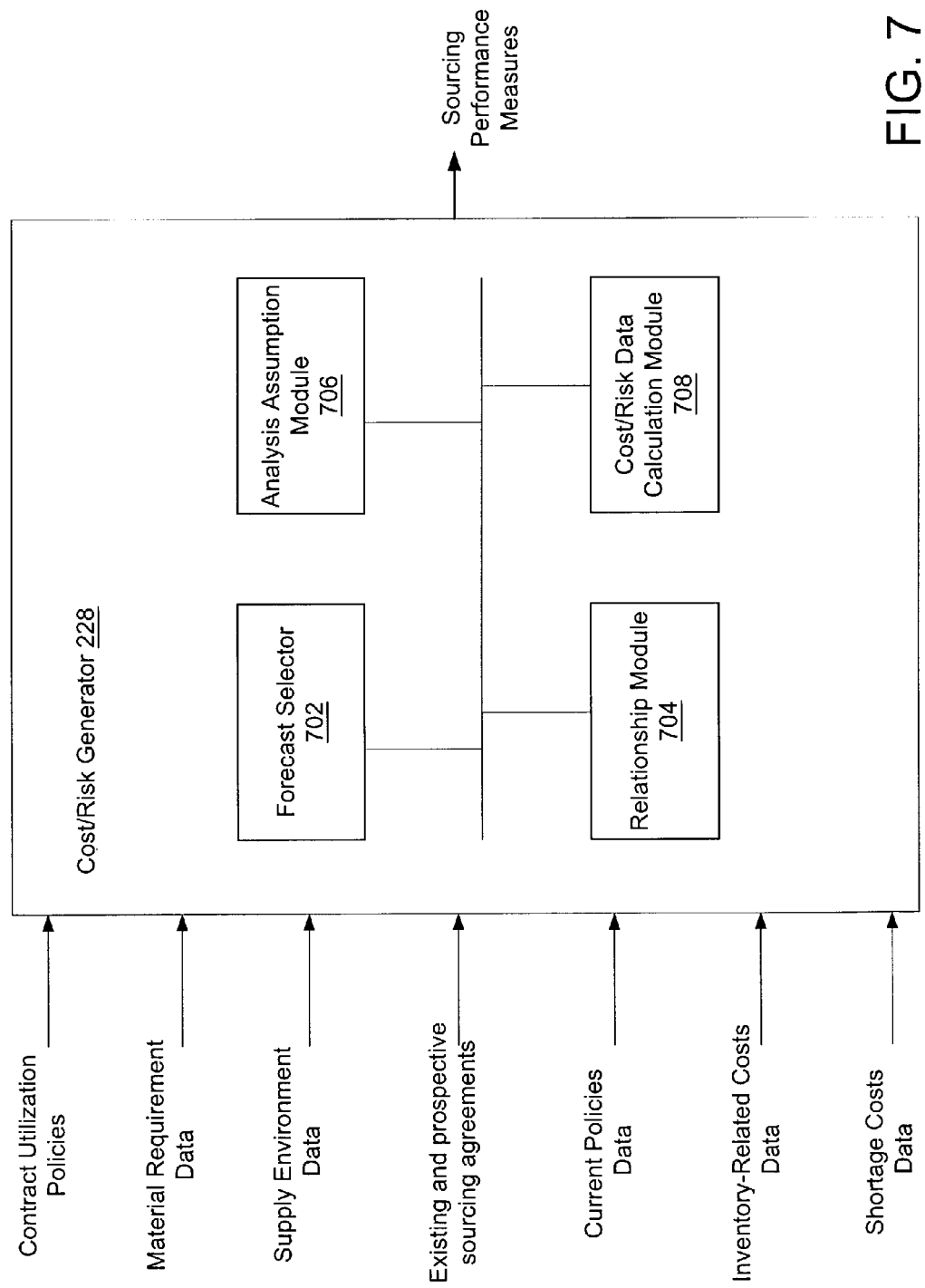
FIG. 7 is an exemplary block diagram of the cost/risk generator of FIG. 2.

Once all sourcing agreements and required scenarios (and parameters) are present, given some future circumstance, the cost/risk generator 228 performs the sourcing agreement and performance analysis. FIG. 7 is a block diagram of an exemplary cost/risk generator 228, according to the present invention. The cost/risk generator 228 includes a forecast selector 702, a relationship module 704, an analysis assumption module 706, and a cost/risk data calculation module 708. In one embodiment, the forecast selector 702 selects a material requirement forecast from the requirement scenarios stored in the requirement database 214 (FIG. 2) and a supply environment forecast from the supply database 218 (FIG. 2).

Next, the relationship module 704 creates a relationship between the material requirement data and the supply environment data. A probability of a material requirement/supply environment combination depends upon the relationship between material requirement and supply environment data. Material requirement and supply environment may be positively correlated, uncorrelated, or negatively correlated. For example, material requirements are typically positively correlated with the supply environment when a differentiation factor between material requirements scenarios is at a level of overall market growth and capacity, is expensive and time consuming to build. Alternatively, material requirements are unrelated with supply environment when (1) a differentiation factor between material requirement scenarios is at the level of market share and (2) capacity is less expensive to build or capacity lead-time is short. Finally, material requirements are negatively related with supply environment when higher company requirements are associated with lower overall market demand.

In alternative embodiments of the present invention, the material requirement scenarios, supply environment forecasts, and their relationship are all selected or created simultaneously. Further, these selection/creation steps may be performed in other sequential orders.

Once a relationship is created, the cost/risk generator 228 identifies relevant existing or prospective sourcing agreements from those stored in the current sourcing database and starting inventory 210 (FIG. 2). Subsequently, the analysis module 706 defines analysis assumptions based on inventory-related costs scenarios from the inventory database 222 (FIG. 2) and shortage costs scenarios from the shortage costs database 226 (FIG. 2). These assumptions may include shortage costs and inventory-related costs, such as storage, financing, and obsolescence costs, for specific points in time and under specific scenarios, as well as cost of capital and initial inventory.

The results of the relationship module 704 and the analysis module 706 are then forwarded to the cost/risk data calculation module 708. Relevant sourcing policies from the sourcing agreement utilization policies 208 (FIG. 2) are also transferred to the cost/risk data calculation module 708, which performs the sourcing agreement and performance analysis by computing future costs and risks for each material requirement and supply environment scenario combination. The cost/risk data calculation module 708 reviews various metrics in evaluating impact on future business performance. These metrics may include, but are not limited to, shortage level, inventory position, price level, and sourcing agreement value. Thus, the cost/risk data calculation module 708 captures the relationship between sourcing agreement structure, sourcing performance, material requirements, supply environment, inventory-related costs, and shortage costs based on sourcing agreement utilization policies and business goals.

Output from the cost/risk data calculation module 708, and subsequently the cost/risk generator 228, may be a plurality of reports presenting costs, risks, and other performance information per period for each possible outcome. Furthermore, reports may present cost, inventory, and availability information for multiple points of time and scenarios given the required parameters and sourcing agreement utilization policies. The output will be discussed in more details in connection with FIG. 10.

Although specific examples of elements are described within the cost/risk generator 228, alternatively, more or less elements may be utilized or other elements may be employed by the present invention.

Figure 8:
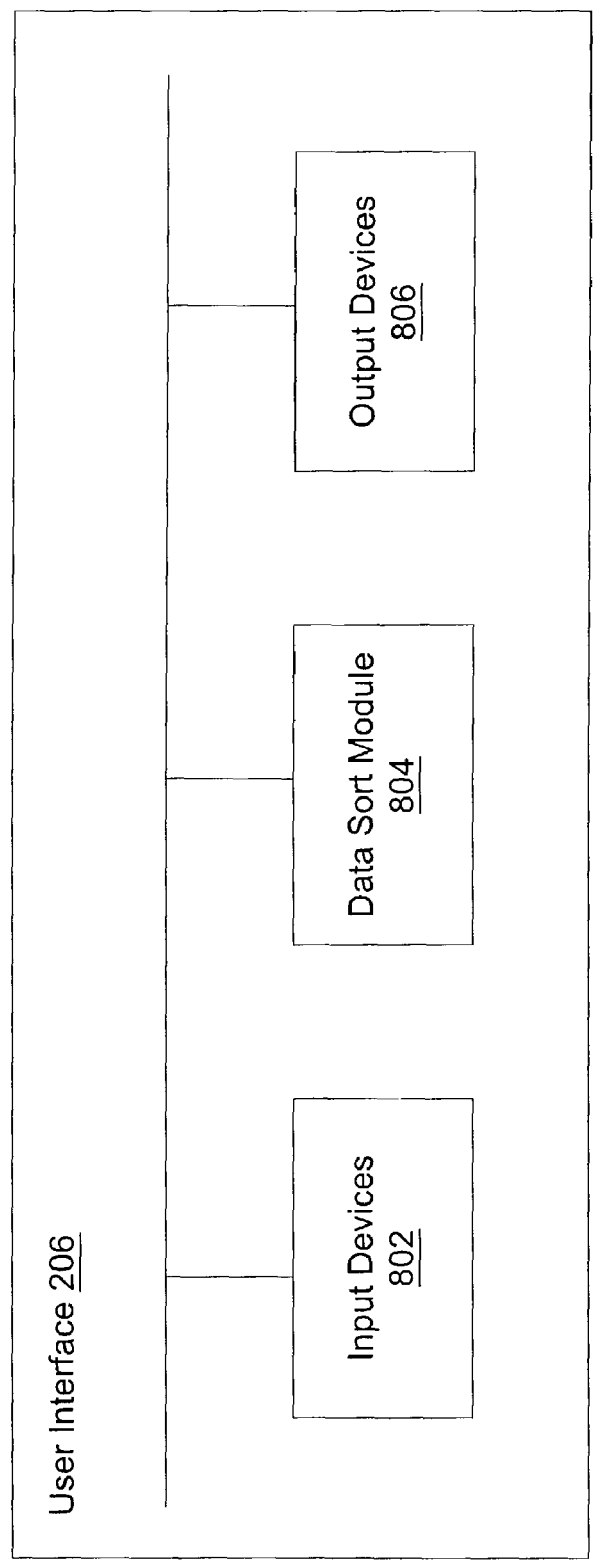
FIG. 8 is an exemplary block diagram of the user interface of FIG. 2.

Referring now to FIG. 8, an exemplary block diagram of the user interface 206 is shown. The user interface 206 comprises various input devices 802, a data sort module 804, and output devices 806. The input devices 802 further comprise a keyboard, mouse, microphone, or any other device capable of providing information to the analysis system 200 (FIG. 2). The information may be in the form of graphs, diagrams, formulae, data points, numerical values, lists, etc.

All of this information is then provided to the data sort module 804, which organizes the input information and forwards the information to an appropriate engine or database in the analysis engine 200. For example, data describing material requirements over a two year period would be sent to the requirements engine 212 (FIG. 3) by the data sort module 804, while data related to a sourcing agreement will be forwarded to the current source database and starting inventory 210 (FIG. 2).

Finally, the results of the cost/risk generator 228 (FIG. 7) are presented to the user via the output devices 806. These output devices may include a display device such as a monitor or a printing device for generating hard copies of the results. Further, results may be forwarded to other systems for analysis. For example, results of the sourcing agreement analysis engine 200 may be mapped through to provide pro form a financial results.

Although specific examples of elements within the user interface 206 are described above, alternatively, more or less elements may be utilized or other elements may be employed by the present invention.

Figure 9:
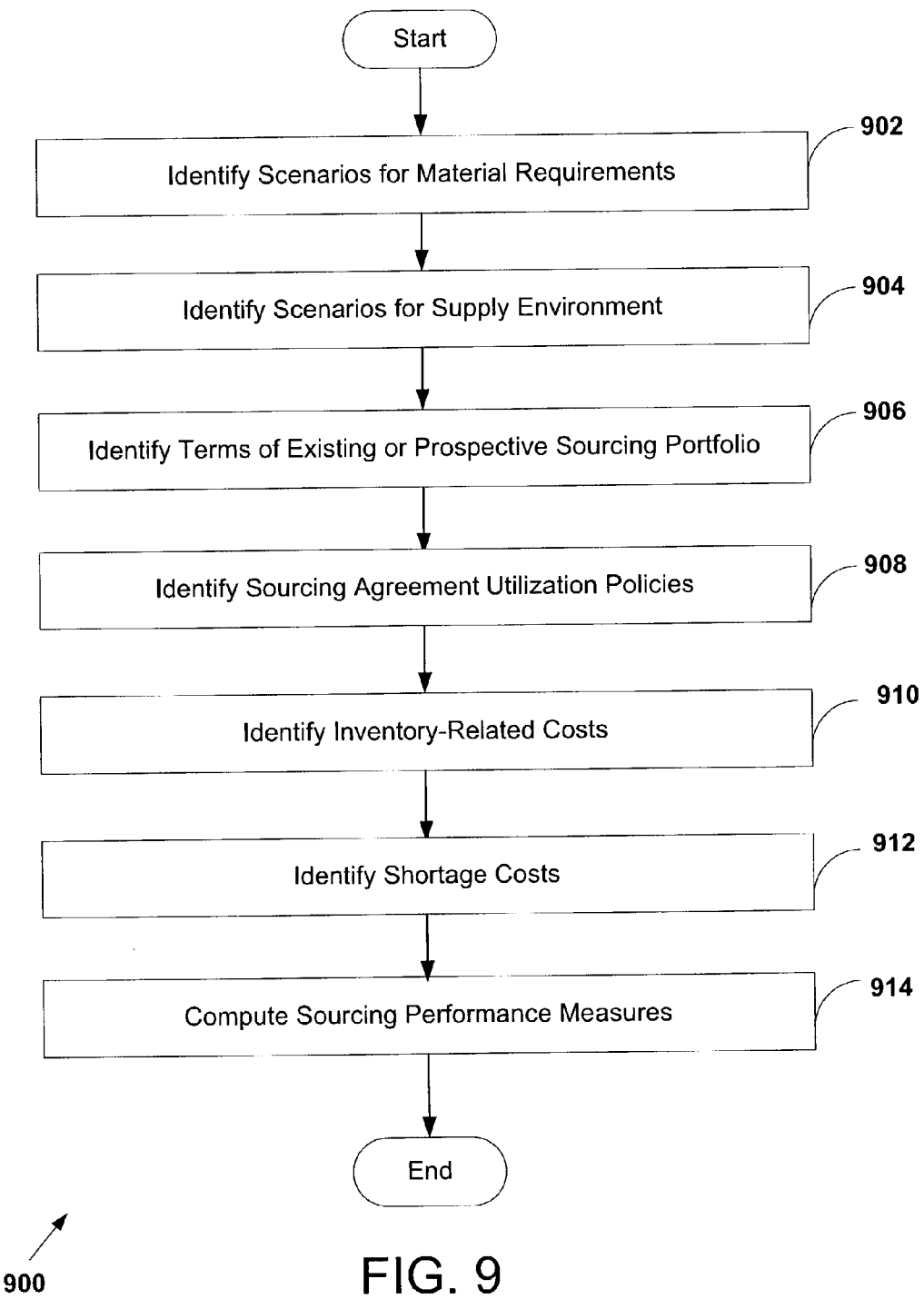
FIG. 9 is a flowchart of an exemplary method for sourcing agreement and performance analysis by the cost/risk generator of FIG. 7.

FIG. 9 is a flowchart 900 of an exemplary method for sourcing agreement and performance analysis by the cost/risk generator 228 (FIG. 7). Initially in block 902, the cost/risk generator 228 selects at least one material requirement scenario or forecast. These scenarios are typically developed by the requirement engine 212 (FIG. 3) based on user inputs and stored in the requirement database 214 (FIG. 2).

Next, at least one scenario for supply environment is selected by the cost/risk generator 228 in block 904. These supply environment scenarios are determined by the supply environment engine 216 (FIG. 4), and subsequently stored in the supply database 218 (FIG. 2). Alternatively, the supply environment scenarios may have been provided by the user and directly input to the supply database 218.

In one embodiment of the present invention, a relationship is developed between the selected material requirement scenario(s) and the supply environment scenario(s) by the relationship module 704 (FIG. 7). Material requirements and supply environment may be positively correlated, uncorrelated, or negatively correlated. In alternative embodiments, the material requirement scenarios, supply environment scenarios, and their relationship are all selected or created simultaneously. Further, these selection/creation processes may be performed in other sequential orders.

Subsequently, the cost/risk generator 228 identifies terms of selected sourcing agreements (e.g., selected current and prospective sourcing agreements), the current material inventory amount, and material on order in block 906. The relevant existing and prospective sourcing agreements are typically input by a user and stored in the current sourcing database and starting inventory 210 (FIG. 2). Current material inventory information may also be initially provided by the user and stored in the current sourcing database and starting inventory 210.

Sourcing agreement utilization policies are then identified in block 908. These utilization policies are provided by the user and stored in the sourcing agreement utilization policies 208 (FIG. 2). Alternatively, generic utilization policies may be generated by the analysis system 200 in lieu of user input utilization policies as previously discussed in connection with FIG. 2. As discussed above, these policies may include constraints on metrics such as inventory and related costs, supply availability, and price performance.

Subsequently in blocks 910 and 912, the inventory-related and shortage costs scenarios are identified. The inventory-related and shortage costs may be input by the user into the analysis engine 200 (FIG. 2) and stored in the inventory-related costs database 222 (FIG. 2) and shortage costs database 226 (FIG. 2), respectively. Alternatively, the inventory-related costs scenarios may be calculated by inventory-related costs processor 220 (FIG. 5) and stored in the inventory-related costs database 222. Similarly, the shortage cost scenarios may be determined by the shortage costs processor 224 (FIG. 6) and then stored in the shortage costs database 226.

Finally, the cost/risk generator 228 takes all the selected material requirement scenarios, supply environment scenarios, selected sourcing agreements and inventory, inventory-related costs, and shortage costs scenarios and computes future sourcing costs and risk and other performance measures based on the given sourcing agreement utilization policies in block 914. The output is a range of results including future inventory, material shortages, material costs, inventory-related costs, and shortage costs over each future scenario. The resulting performance measure outputs provide guidance to the user as to the performance of existing or prospective sourcing agreements and their utilization policies in different future scenarios given particular business goals. The output reports may analyze overall sourcing performance, cost performance, price performance, inventory performance, shortage performance, or any combination thereof, and be in the form of spreadsheets, graphs, charts, raw data, etc.

It should be noted that FIG. 9 provided an exemplary method for analysis of sourcing agreements and performance. Alternatively, the identifying steps of the method may be performed in a different order. For example, the sourcing agreement utilization policies may be identified after the inventory-related and shortage costs have been identified. In yet further embodiments, more or less steps may be performed by the method. Further, alternative embodiments may utilize other scenarios or parameters (e.g., scenarios or parameters in addition to those described above), fewer scenarios or parameters, more scenarios or parameters, or different combinations of scenarios or parameters.

The range of outputs provides guidance to the user as to future circumstances based on implementation and utilization of certain sourcing agreements and relationships. The user must ultimately decide given the various outputs which option is best for the business. For example, the output of the cost/risk generator 228 may include two options. Option A may have 4% material shortage, an average of 90 days of inventory, and $0.90 component price per unit resulting in a total sourcing cost of $17.6 million per year. Alternatively, option B may have 3% material shortage, an average of 60 days of inventory, and a component price of $1.00 per unit resulting in a total sourcing cost of $17.8 million per year. If the business' objective is to reduce total sourcing costs and there are no other constraints or risk management objectives, then option A ($17.6 million total cost) would be the proper choice. However, given the same objective, but with a constraint of keeping inventory at 60 days or less, then the business should choose option B ($17.8 million total cost).

Figure 10:
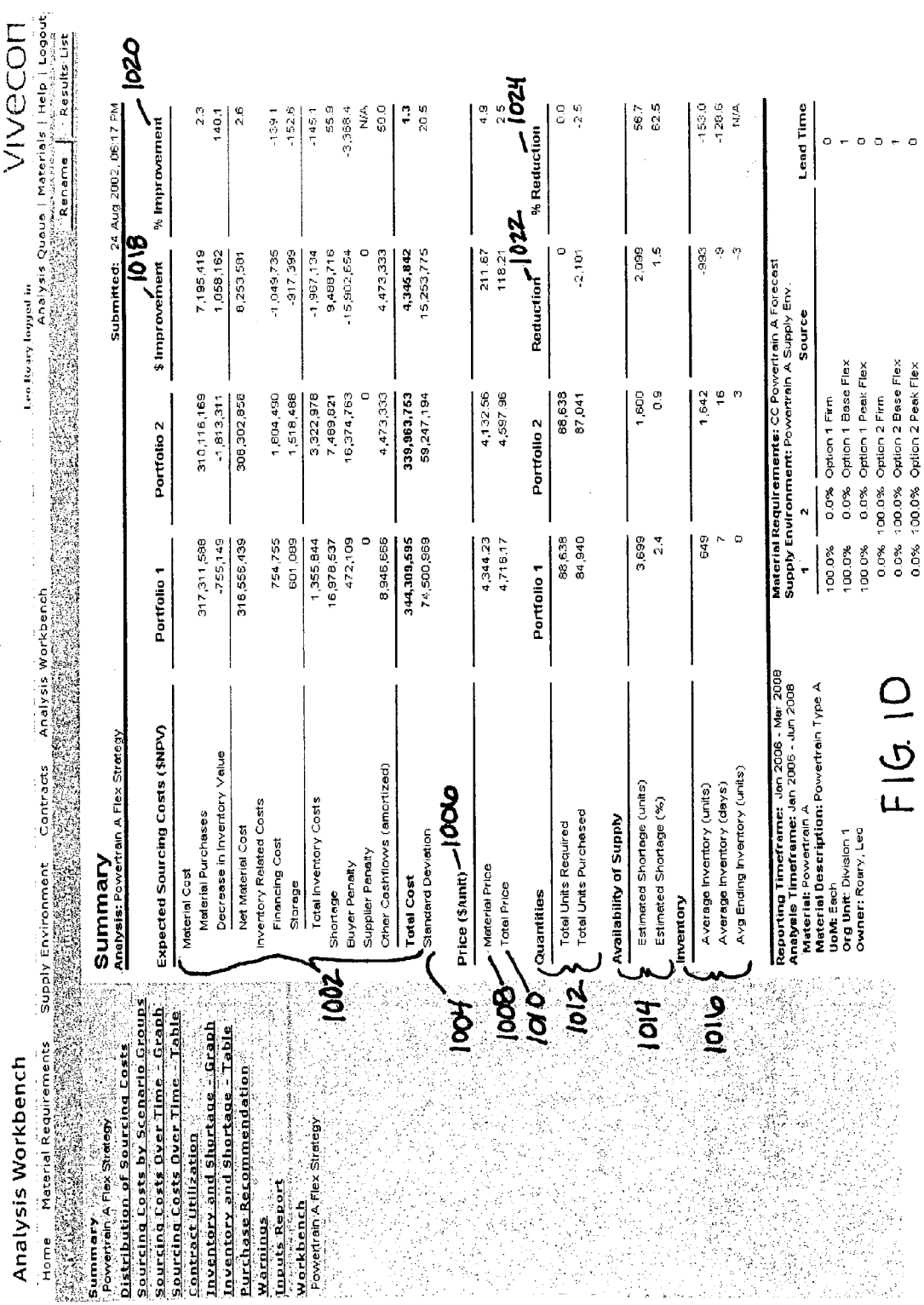
FIG. 10 is an exemplary illustration of an output of sourcing performance.

FIG. 10 is an exemplary output summary based on two different portfolios. The expected sourcing costs section 1002 comprises all costs related to sourcing activities and costs of not meeting requirements (e.g., shortage costs and penalties). This section 1002 illustrates the amount of money a user may expect to spend given a current sourcing portfolio during a particular analysis timeframe. A standard deviation line 1004 located immediately below the expected sourcing costs section 1002 shows how far off the cost can be from an expected value shown directly above.

A price section 1006 comprises a material price line 1008 and a total price line 1010. The material price line 1008 is an average price paid per purchased unit during the analysis timeframe. Consequently, the total price line 1010 includes material price from the material price line 1008 along with shortage costs, inventory-related costs, penalties, and other cashflow costs. In alternative embodiments, more or less types of costs, or other forms of costs may be utilized by the present invention.

In the present embodiment, other sections are provided in the output summary including a quantities section 1012, an availability of supply section 1014, and an inventory section 1016. The quantities section 1012 shows a total unit requirement and a total unit purchased for each portfolio, while the availability of supply section 1014 illustrates whether the portfolio is meeting expected requirements. Finally, the inventory section 1016 shows average inventory in units, average inventory per day, and average ending inventory in units.

The two portfolios are compared in a cost improvement column 1018 and a percent improvement column 1020. The cost improvement column 1018 shows a difference in cost between the first portfolio and a second portfolio, while the percent improvement column 1020 indicates improvement in percentages of using the second portfolio over the first portfolio. Differences between quantities, availability of supply, and inventory are also determined and displayed in a reduction column 1022 and a percent reduction column 1024.

It should be noted that the output summary of FIG. 10 is an exemplary embodiment, and other types of output summaries are contemplated by the present invention. For example, content of the output summary may be different, such as having more than two portfolios compared or other elements and values presented and compared. Furthermore, the output summary may be presented in different forms. For example, the summary may be presented graphically, the columns and rows may be organized in a different fashion, etc.

Although the present invention has been described in terms of providing a range of results for utilizing existing or proposed sourcing agreements, in a further embodiment, the present invention may generate an optimized result based on user-input rules and policies. Therefore, given a set of specific business goals, the analysis engine 200 will determine for the user which sourcing agreement or set of sourcing agreements should be employed in order to meet the business goals, and how those sourcing agreements should be optimally utilized.

In yet a further embodiment, the results of the present invention may be utilized by the business to support other analysis in additional business environments. Thus, the analysis system 200 takes the output of the cost/risk generation 228 and maps the output through to other variables and charts in which other decision makers in the business will be interested. For example, the output of the cost/risk generator 228 may be mapped through to provide pro form a financial results, which a controller may use for making related financial decisions. Alternatively, output of the cost/risk generator 228 may be used to support product pricing decisions, or used to structure and analyze customer sales contracts.

In yet further embodiments, the present invention may be utilized to monitor on-going business operations. A user may update key inputs to maintain a current database of information, for example at regular intervals or on an event-driven basis. Consequently, the system of the present invention will project future sourcing performance based on the current existing database.

The invention has been described above with reference to exemplary embodiments. It will be apparent to those skilled in the art that various modifications may be made and other embodiments can be used without departing from the broader scope of the invention. For example, any data described as being user-input may actually be fed from another source such as on-line data from the Internet or another supplied database. Therefore, these and other variations upon the specific embodiments are intended to be covered by the present invention.

What is claimed is:

1. A method for analysis of relative benefits of sourcing agreements and utilization policies for sourcing agreements when future sourcing-related business conditions are uncertain over a time period of analysis, the method comprising the steps of:

selecting two or more material requirements scenarios over the time period of analysis, such that each of the selected material requirements scenarios has a specified probability of occurrence;

identifying terms of one or more existing or prospective sourcing agreements, such that the identified terms specify price, quantity, and delivery terms for material under each of the one or more sourcing agreements;

identifying a set of sourcing agreement utilization policies for the one or more sourcing agreements, which specify, for each of the selected material requirements scenarios, the material to be purchased and actions to be taken under each of the sourcing agreements under that scenario; and computing, by a computer in a computer system, future sourcing performance measures for each of the selected scenarios by applying the selected sourcing agreement utilization policy for the selected scenario to the material requirements over the time period of analysis under that scenario, subject to the terms of the sourcing agreements, such that the measures indicate relative benefits over the selected scenarios of the sourcing agreements given the sourcing agreement utilization policies, including future materials costs, shortage and inventory levels, and shortage and inventory-related costs for each of the selected scenarios.

2. The method of claim 1 further comprising the step of identifying two or more inventory-related costs scenarios for analysis in computing future sourcing performance measures.

3. The method of claim 1 further comprising the step of identifying two or more shortage cost scenarios for analysis in computing future sourcing performance measures.

4. The method of claim 1 further comprising the step of defining analysis assumptions based on identified costs scenarios.

5. The method of claim 1 further comprising the step of generating a joint probability distribution between the two or more material requirements scenarios and two or more supply environment scenarios.

6. The method of claim 1 further comprising the step of generating at least one output report of the future sourcing performance measures.

7. The method of claim 6, wherein the output report of the future sourcing performance measures comprises a report of inventory level with respect to number of units, material quantity with respect to units purchased, material availability with respect to inventory level and units purchased, and expected costs of obtaining the material and costs of maintaining the inventory level for each of the selected material requirements scenarios.

8. The method of claim 1, wherein the sourcing agreements include terms comprising future prices and quantities of materials.

9. The method of claim 1, wherein identifying terms of sourcing agreements further comprises identifying terms of current material inventory amount and material on order.

10. The method of claim 1, further including selecting two or more supply environment scenarios that are associated with at least one probabilistic model of uncertain future events.

11. The method of claim 10, wherein selecting two or more material requirements scenarios and selecting two or more supply environment scenarios further comprises determining a relationship between the respective scenarios.

12. The method of claim 1, wherein the set of sourcing agreement utilization policies is selected to achieve performance objectives for one or more of the future sourcing performance measures computed for the selected scenarios.

13. The method of claim 1, wherein the set of sourcing agreement utilization policies is selected to satisfy constraints on one or more of the future sourcing performance measures computed for the selected scenarios.

14. The method of claim 1, wherein the set of sourcing agreement utilization policies is selected in accordance with at least one of achieving performance objectives of, or satisfying constraints on, one or more of the future sourcing performance measures computed for the selected scenarios.

15. The method of claim 14, wherein at least one of the constraints or the objectives is specified for one or more subsets of the scenarios.

16. The method of claim 14, wherein at least one of the constraints or the objectives include values of sourcing performance measures that are aggregated across scenarios using probability values.

17. The method of claim 14, wherein at least one of the constraints or the objectives include values of sourcing performance measures that are aggregated across time.

18. The method of claim 17, wherein the sourcing performance measures include at least one of summations of quantity measures, or averages of quantity measures, or net present values of financial measures.

19. The method of claim 14, wherein at least one of the constraints or the objectives include the evolution of sourcing performance measures over time on one or more of the selected scenarios.

20. The method of claim 14, wherein at least one of the constraints or the objectives include at least one of inventory levels, or inventory policies, or inventory-related costs.

21. The method of claim 14, wherein at least one of the constraints or the objectives include at least one of shortage levels or shortage costs.

22. The method of claim 14, wherein at least one of the constraints or the objectives include at least one of buyer or supplier penalties or incentives.

23. The method of claim 14, wherein at least one of the constraints or the objectives include at least one of capacity constraints or capacity utilization policies.

24. The method of claim 14, wherein at least one of the constraints or the objectives include at least one of the available quantity or price of other related materials.

25. The method of claim 14, wherein at least one of the constraints or the objectives include the amount of material purchased under one or more combinations of future material price and availability conditions represented by two or more supply environment scenarios.

26. The method of claim 14, wherein at least one of the constraints or the objectives incorporate one or more future inventory cost conditions represented by two or more inventory cost scenarios.

27. The method of claim 14, wherein at least one of the constraints or the objectives incorporate one or more future shortage cost conditions represented by two or more shortage cost scenarios.

28. The method of claim 14, wherein at least one of the constraints or the objectives include actions under at least one of the specific sourcing agreements or the types of sourcing agreements.

29. The method of claim 14, wherein at least one of the constraints or the objectives include actions under sourcing agreements with at least one of specific suppliers or suppliers grouped by one or more characteristics.

30. The method of claim 14, further comprising:
generating a report that shows at least one of the terms of one or more sourcing agreements, or the values of one or more sourcing agreement utilization policies, together with at least one of objectives for or constraints on, one or more of the future sourcing performance measures.

31. The method of claim 14, further comprising:
generating a report that shows values of one or more sourcing performance metrics and at least one of objectives for, or constraints on, one or more of the future sourcing performance measures.

32. The method of claim 1, wherein the set of sourcing agreement utilization policies is selected, subject to one or more constraints on the sourcing agreement utilization policy values, or subject to one or more objectives of the sourcing agreement utilization policy values, or subject to both one or more constraints on the sourcing agreement utilization policy values and one or more objectives of the sourcing agreement utilization policy values.

33. The method of claim 32, wherein the one or more of the constraints or the objectives are specified for one or more subsets of the selected scenarios, such that at least one of the subsets include specified probability values.

34. The method of claim 32, wherein the one or more of the constraints or the objectives include values of sourcing agreement utilization policies that are aggregated across scenarios using probability values.

35. The method of claim 32, wherein the one or more of the constraints or the objectives include values of sourcing agreement utilization polices that are aggregated across time.

36. The method of claim 35, wherein the sourcing agreement utilization policies include at least one of summations of quantity measures, or averages of quantity measures, or net present values of financial measures.

37. The method of claim 32, wherein the one or more of the constraints or the objectives include the evolution of sourcing agreement utilization policy values over time on one or more of the selected scenarios.

38. The method of claim 32, wherein the one or more of the constraints or the objectives include at least one of inventory levels, or inventory policies, or inventory-related costs.

39. The method of claim 32, wherein the one or more of the constraints or the objectives include at least one of shortage levels, or shortage policies, or shortage costs.

40. The method of claim 32, wherein the one or more of the constraints or the objectives include at least one of capacity constraints or capacity utilization policies.

41. The method of claim 32, wherein the one or more of the constraints or the objectives include at least one of the quantity of other related materials or the price of other related materials.

42. The method of claim 32, wherein the one or more of the constraints or the objectives incorporate one or more future material price and availability conditions represented by two or more supply environment scenarios.

43. The method of claim 32, wherein the one or more of the constraints or the objectives incorporate one or more future inventory cost conditions represented by two or more inventory cost scenarios.

44. The method of claim 32, wherein the one or more of the constraints or the objectives incorporate one or more future shortage cost conditions represented by two or more shortage cost scenarios.

45. The method of claim 32, wherein the one or more of the constraints or the objectives include actions under specific sourcing agreements or types of sourcing agreements.

46. The method of claim 32, wherein the one or more of the constraints or the objectives include actions under sourcing agreements with at least one of the specific suppliers, or the suppliers grouped by one or more characteristics.

47. The method of claim 32, further comprising:
generating a report that shows at least one of terms of one or more sourcing agreements, or values of one or more sourcing agreement utilization policies, together with the at least one of objectives for, or constraints on, sourcing agreement utilization policy values.

48. The method of claim 32, further comprising:
generating a report that shows values of one or more sourcing performance metrics and at least one of objectives for, or constraints on, sourcing agreement utilization policy values.

49. The method of claim 1, wherein shortage costs include at least one of lost margin, lost revenue, expediting costs, on-time delivery costs, late delivery discounts, lost market share, or damaged customer relationships.

50. A system for analysis of relative benefits of sourcing agreements and utilization policies for sourcing agreements when future sourcing-related business conditions are uncertain over a time period of analysis, the system comprising:
means for selecting two or more material requirements scenarios over the time period of analysis, such that each of the selected material requirements scenarios has a specified probability of occurrence;

means for identifying terms of one or more existing or prospective sourcing agreements, such that the identified terms specify price, quantity, and delivery terms for material under each of the one or more sourcing agreements;

means for identifying a set of sourcing agreement utilization policies for the one or more sourcing agreements, which specify, for each of the selected material requirements scenarios, the material to be purchased and actions to be taken under each of the sourcing agreements under that scenario; and means for computing future sourcing performance measures for each of the selected scenarios by applying the selected sourcing agreement utilization policy for the selected scenario to the material requirements over the time period of analysis under that scenario, subject to the terms of the sourcing agreements, such that the measures indicate relative benefits over the selected scenarios of the sourcing agreements given the sourcing agreement utilization policies, including future materials costs, shortage and inventory levels, and shortage and inventory-related costs for of the selected scenarios.

51. The system of claim 50, further including means for selecting two or more supply environment scenarios that are associated with at least one probabilistic model of uncertain future events.

52. The system of claim 50, wherein the means for computing future sourcing performance measures includes means for generating at least one output report of the future sourcing performance measures such that the output report comprises a report of inventory level with respect to number of units, material quantity with respect to units purchased, material availability with respect to inventory level and units purchased, and expected costs of obtaining the material and costs of maintaining the inventory level for each of the selected material requirements scenarios.

53. A method for analyzing relative benefits of sourcing agreements and utilization policies for sourcing agreements when future sourcing-related business conditions are uncertain over a time period of analysis, the method comprising the steps of selecting a plurality of material requirements scenarios over the time period of analysis, such that each of the selected material requirements scenarios has a specified probability of occurrence;

identifying terms of one or more existing or prospective sourcing agreements, such that the identified terms specify price, quantity, and delivery terms for material under each of the one or more sourcing agreements;

identifying a set of sourcing agreement utilization policies for the one or more sourcing agreements, which specify, for each of the selected material requirements scenarios, the material to be purchased and actions to be taken under each of the sourcing agreements under that scenario; and computing, by a computer in a computer system, future sourcing performance measures for each of the selected scenarios by applying the selected sourcing agreement utilization policy for the selected scenario to the material requirements over the time period of analysis under that scenario, subject to the terms of the sourcing agreements, such that the measures indicate relative benefits over the selected scenarios of the sourcing agreements given the sourcing agreement utilization policies, including future materials costs, shortage and inventory levels, and shortage and inventory-related costs for each of the selected scenarios.

54. The method of claim 53 wherein the plurality of scenarios comprises two or more material requirements scenarios.

55. The method of claim 53 wherein the plurality of scenarios comprises two or more supply environment scenarios.

56. The method of claim 53 wherein the plurality of scenarios comprises two or more inventory-related costs scenarios.

57. The method of claim 53 wherein the plurality of scenarios comprises two or more shortage costs scenarios.

* * * * *